United States Patent
Honda

(10) Patent No.: US 10,340,535 B2
(45) Date of Patent: Jul. 2, 2019

(54) FUEL CELL SYSTEM

(71) Applicant: HONDA MOTOR CO., LTD., Tokyo (JP)

(72) Inventor: Seiji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 290 days.

(21) Appl. No.: 15/352,470

(22) Filed: Nov. 15, 2016

(65) Prior Publication Data
US 2017/0179504 A1   Jun. 22, 2017

(30) Foreign Application Priority Data
Dec. 21, 2015 (JP) ................. 2015-248109

(51) Int. Cl.
| | |
|---|---|
| *H01M 8/04111* | (2016.01) |
| *H01M 8/04007* | (2016.01) |
| *H01M 8/04082* | (2016.01) |
| *H01M 8/04746* | (2016.01) |
| *H01M 8/0662* | (2016.01) |
| *H01M 8/04089* | (2016.01) |

(52) U.S. Cl.
CPC .... *H01M 8/04111* (2013.01); *H01M 8/04007* (2013.01); *H01M 8/04089* (2013.01); *H01M 8/04201* (2013.01); *H01M 8/04753* (2013.01); *H01M 8/0662* (2013.01); *H01M 2250/20* (2013.01)

(58) Field of Classification Search
CPC ......... H01M 8/04111; H01M 8/04089; H01M 8/0662; H01M 8/04753; H01M 8/04007; H01M 8/04201; H01M 2250/20
See application file for complete search history.

(56) References Cited

U.S. PATENT DOCUMENTS 6,176,897 B1 * 1/2001 Keefer ............... B01D 53/0476
                                                    95/101
6,427,471 B1 * 8/2002 Ando ..................... B64D 13/06
                                                    62/402

FOREIGN PATENT DOCUMENTS

| JP | 07-014599 | 1/1995 |
| JP | 2003-086224 | 3/2003 |

(Continued)

OTHER PUBLICATIONS

Japanese Office Action for corresponding JP Application No. 2015-248109, dated Aug. 28, 2018 (w/ machine translation).

*Primary Examiner* — Muhammad S Siddiquee
(74) *Attorney, Agent, or Firm* — Mori & Ward, LLP

(57) ABSTRACT

A fuel cell system includes a fuel cell, an oxidant gas supply piping, an oxidant gas discharge piping, an air compressor, a turbine, a pressure regulating valve, and a check valve. The fuel cell generates electric power through an electrochemical reaction between a fuel gas and an oxidant gas. The oxidant gas supply piping is connected to the fuel cell. The oxidant gas discharge piping is connected to the fuel cell. The air compressor is connected to the oxidant gas supply piping and is rotatable around a rotational shaft. The turbine is connected to the oxidant gas discharge piping and is rotatable around the rotational shaft. The pressure regulating valve is disposed in the oxidant gas discharge piping between the fuel cell and the turbine. The check valve is connected to the oxidant gas discharge piping between the turbine and the pressure regulating valve.

6 Claims, 8 Drawing Sheets

(56) References Cited

FOREIGN PATENT DOCUMENTS

| | | |
|---|---|---|
| JP | 2013-008445 | 1/2013 |
| JP | 2015-002009 | 1/2015 |

* cited by examiner

FUEL CELL SYSTEM

CROSS-REFERENCE TO RELATED APPLICATIONS

The present application claims priority under 35 U.S.C. § 119 to Japanese Patent Application No. 2015-248109, filed Dec. 21, 2015, entitled "Fuel Cell System." The contents of this application are incorporated herein by reference in their entirety.

BACKGROUND

1. Field

The present disclosure relates to a fuel cell system.

2. Description of the Related Art

For example, a solid polymer electrolyte fuel cell employs an electrolyte membrane made up of a polymer ion-exchange membrane. In a fuel cell, an electrolyte membrane/electrode structural body (MEA) in which a one-side surface of an electrolyte membrane is provided with an anode electrode and the other-side surface of the electrolyte membrane is provided with a cathode electrode is sandwiched between separators. An electrolyte membrane/electrode structural body is sandwiched between separators (bipolar plates) so as to constitute an electricity generating cell. In usual uses of fuel cells, a predetermined number of electricity generating cells are stacked to form a fuel cell stack such as a vehicular fuel cell stack that is mounted in a fuel cell electric vehicle.

In an example of the construction of a fuel cell, a fuel gas (hydrogen gas) stored in a fuel tank (hydrogen tank) is supplied to the anode electrode while external air (oxidant gas) is supplied to the cathode electrode by using a compressor or the like. An output adjusting apparatus of a fuel cell apparatus disclosed in, for example, Japanese Unexamined Patent Application Publication No. 7-14599 includes a variable-rotation speed compressor (compressing apparatus) provided on the air supply pipe to the fuel cell and a turbine (expanding apparatus) provided on an air discharge pipe. In this output adjusting apparatus, the compressor and the turbine are provided on the same shaft.

SUMMARY

According to one aspect of the present invention, a fuel cell system includes a fuel cell, an oxidant gas supply piping, an oxidant gas discharge piping, an air compressor, a turbine, a pressure regulating valve, and a check valve. The fuel cell generates electricity through an electrochemical reaction between a fuel gas and an oxidant gas. The oxidant gas supply piping supplies the oxidant gas to the fuel cell. The oxidant gas discharge piping discharges the oxidant gas from the fuel cell. The air compressor is disposed on the oxidant gas supply piping. The turbine is disposed on the oxidant gas discharge piping and provided on the same shaft as the air compressor. The pressure regulating valve is disposed on the oxidant gas discharge piping between the fuel cell and the turbine. The check valve is provided between the turbine and the pressure regulating valve and communicates with outside air so as to introduce an external air to the turbine.

According to another aspect of the present invention, a fuel cell system includes a fuel cell, an oxidant gas supply piping, an oxidant gas discharge piping, an air compressor, a turbine, a pressure regulating valve, and a check valve. The fuel cell generates electric power through an electrochemical reaction between a fuel gas and an oxidant gas. The oxidant gas supply piping is connected to the fuel cell. The oxidant gas flows to the fuel cell through The oxidant gas supply piping. The oxidant gas discharge piping is connected to the fuel cell. The oxidant gas is discharged from the fuel cell via The oxidant gas discharge piping. The air compressor is connected to the oxidant gas supply piping and is rotatable around a rotational shaft. The turbine is connected to the oxidant gas discharge piping and is rotatable around the rotational shaft. The pressure regulating valve is disposed in the oxidant gas discharge piping between the fuel cell and the turbine. The check valve is connected to the oxidant gas discharge piping between the turbine and the pressure regulating valve to introduce an external air to the turbine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
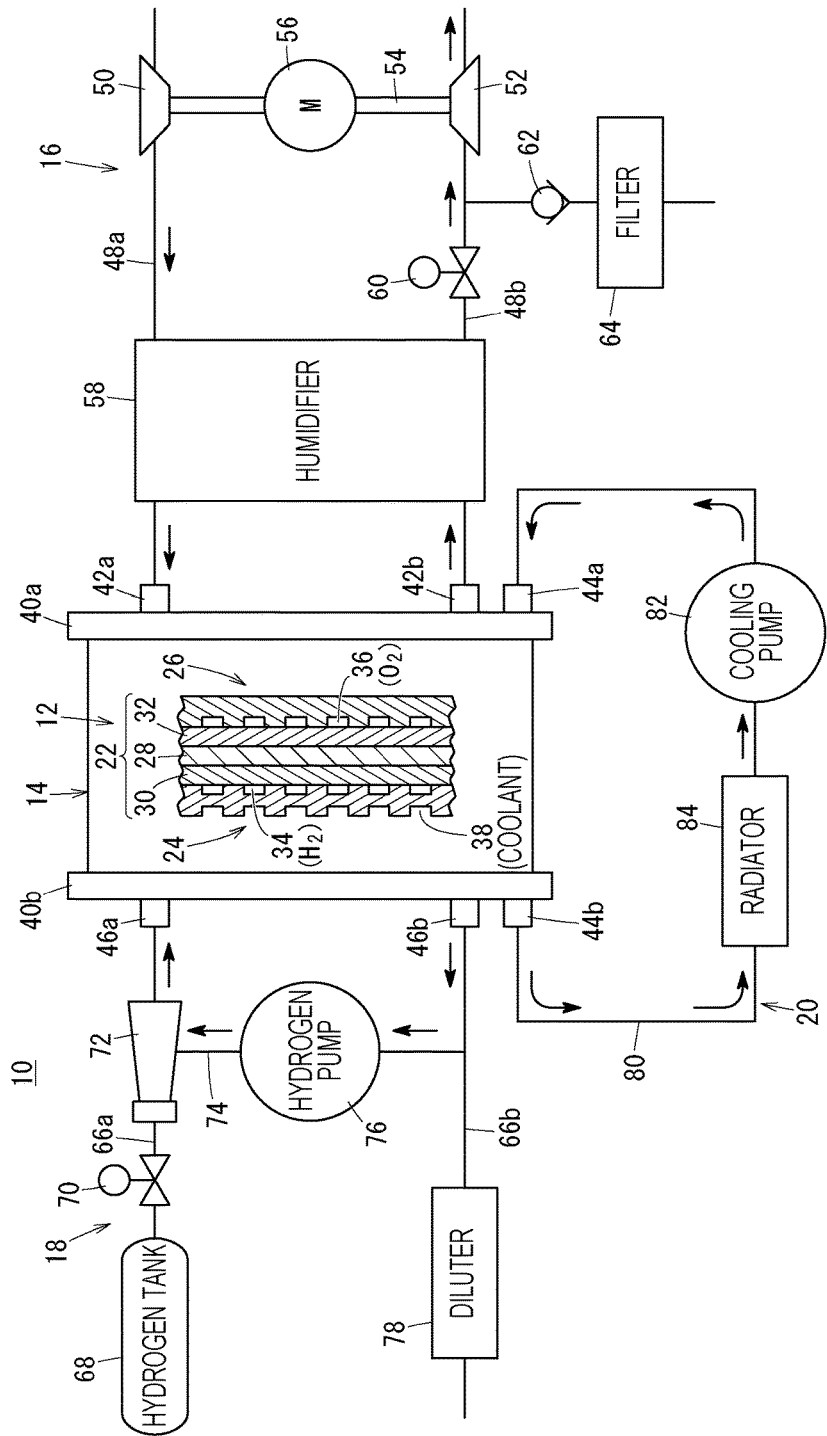
FIG. 1 is a general diagram illustrating a construction of a fuel cell system according to a first embodiment of the present disclosure.

The embodiments will now be described with reference to the accompanying drawings, wherein like reference numerals designate corresponding or identical elements throughout the various drawings.

As shown in FIG. 1, a fuel cell system 10 according to a first embodiment of the present disclosure constitutes, for example, a vehicular fuel cell system that is mounted in an electric vehicle such as a fuel cell electric vehicle.

The fuel cell system 10 includes a fuel cell stack 14 in which a plurality of electricity generating cells (fuel cells) 12 are stacked, an oxidant gas supply apparatus 16 that supplies an oxidant gas to the fuel cell stack 14, and a fuel gas supply apparatus 18 that supplies a fuel gas to the fuel cell stack 14. The fuel cell system 10 further includes a cooling medium supply apparatus 20 that supplies a cooling medium to the fuel cell stack 14.

Each electricity generating cell 12 is constructed by disposing a first separator 24 and a second separator 26 on opposite sides of an electrolyte membrane/electrode structural body 22. The first separator 24 and the second separator 26 are each made up of a metal separator or a carbon separator. The electrolyte membrane/electrode structural body 22 includes, for example, a solid polymer electrolyte membrane 28 that is a water-containing thin film of perfluorosulfonic acid, and further includes an anode electrode 30 and a cathode electrode 32 disposed on opposite sides of the solid polymer electrolyte membrane 28. The solid polymer electrolyte membrane 28 may contain a fluorine-based electrolyte and also a hydrocarbon (HC)-based electrolyte.

The first separator 24 of each electricity generating cell 12, together with the electrolyte membrane/electrode structural body 22, forms a fuel gas channel 34 for supplying the fuel gas to the anode electrode 30. The second separator 26 of each electricity generating cell 12, together with the electrolyte membrane/electrode structural body 22, forms an oxidant gas channel 36 for supplying the oxidant gas to the cathode electrode 32. Between first separators 24 and second separators 26 adjacent to each other in the fuel cell stack 14 there are provided cooling medium channels 38 through which the cooling medium is passed.

One of two end plates 40a that constitute the fuel cell stack 14 is provided with an oxidant gas inlet manifold 42a, an oxidant gas outlet manifold 42b, and a cooling medium inlet manifold 44a that individually extend in the stacking direction of the electricity generating cells 12 and communicate separately with each electricity generating cell 12. The other one of the end plates 40b of the fuel cell stack 14 is provided with a fuel gas inlet manifold 46a, a fuel gas outlet manifold 46b, and a cooling medium outlet manifold 44b that individually extend in the stacking direction of the electricity generating cells 12 and communicate separately with each electricity generating cell 12.

The oxidant gas inlet manifold 42a and the oxidant gas outlet manifold 42b communicate with the oxidant gas channels 36 and pass the oxidant gas, for example, an oxygen-containing gas (hereinafter, referred to also as air). The cooling medium inlet manifold 44a and the cooling medium outlet manifold 44b communicate with the cooling medium channels 38 and pass the cooling medium. The fuel gas inlet manifold 46a and the fuel gas outlet manifold 46b communicate with the fuel gas channels 34 and pass the fuel gas, for example, a hydrogen-containing gas (hereinafter, referred to also as hydrogen gas).

The oxidant gas supply apparatus 16 includes an oxidant gas supply piping 48a that communicates with the oxidant gas inlet manifold 42a of the fuel cell stack 14 and an oxidant gas discharge piping 48b that communicates with the oxidant gas outlet manifold 42b of the fuel cell stack 14. An upstream-side portion of the oxidant gas supply piping 48a is provided with an air compressor 50. A downstream-side portion of the oxidant gas discharge piping 48b is provided with a turbine 52. The air compressor 50 and the turbine 52 are provided on the same shaft 54. The shaft 54 is connected to a motor 56, thus forming a motor turbo.

The oxidant gas supply piping 48a and the oxidant gas discharge piping 48b are provided with a humidifier 58 that is located downstream of the air compressor 50. The humidifier 58 needs only to be capable of humidifying the air to be supplied and is not particularly limited in terms of structure. The oxidant gas discharge piping 48b is provided with a pressure regulating valve 60 that is located between the fuel cell stack 14 (and the humidifier 58) and the turbine 52.

The oxidant gas discharge piping 48b is provided with a check valve 62 that is located between the turbine 52 and the pressure regulating valve 60 and that communicates with the outside air and introduces external air into the turbine 52. The check valve 62 may be, for example an umbrella valve; however, other types of check valves may also be employed. An outside air side of the check valve 62 is provided with an air filter 64. It suffices that the air filter 64 is able to block entrance of undesired objects from the outside; accordingly, various filters may be employed as the air filter 64.

The fuel gas supply apparatus 18 includes a fuel gas supply piping 66a that communicates with the fuel gas inlet manifold 46a of the fuel cell stack 14 and a fuel gas discharge piping 66b that communicates with the fuel gas outlet manifold 46b of the fuel cell stack 14. An upstream portion of the fuel gas supply piping 66a is connected to a hydrogen tank 68 that stores a high-pressure hydrogen. Downstream of the hydrogen tank 68 there are provided a sealing valve 70 and an ejector 72.

A hydrogen circulation passageway 74 is connected to the ejector 72 and to an intermediate portion of the fuel gas discharge piping 66b. The hydrogen circulation passageway 74 is provided with a hydrogen pump 76 for circulating hydrogen. A downstream portion of the fuel gas discharge piping 66b is connected to a diluter 78 that dilutes discharged hydrogen with air.

The cooling medium supply apparatus 20 includes a cooling medium circulation passageway 80 that communicates with the cooling medium inlet manifold 44a and the cooling medium outlet manifold 44b of the fuel cell stack 14 so as to circulate and supply the cooling medium. The cooling medium circulation passageway 80 is provided with a cooling pump 82 disposed relatively near to the cooling medium inlet manifold 44a and with a radiator 84 disposed relatively near to the cooling medium outlet manifold 44b.

Operations of the fuel cell system 10 constructed as described above will be described below.

As shown in FIG. 1, when the motor 56 of the oxidant gas supply apparatus 16 rotates, air is sent into the oxidant gas supply piping 48a via the air compressor 50. This air is humidified when passing through the humidifier 58, and then is supplied to the oxidant gas inlet manifold 42a of the fuel cell stack 14.

On the other hand, in the fuel gas supply apparatus 18, when the sealing valve 70 is open, the hydrogen gas is supplied from the hydrogen tank 68 into the fuel gas supply piping 66a. This hydrogen gas is supplied to the fuel gas inlet manifold 46a of the fuel cell stack 14.

The air is introduced from the oxidant gas inlet manifold 42a into the oxidant gas channel 36 of each second separator 26. The air moves along the oxidant gas channels 36 and is supplied to the cathode electrodes 32 of the electrolyte membrane/electrode structural bodies 22. On the other hand, the hydrogen gas is introduced from the fuel gas inlet manifold 46a into the fuel gas channel 34 of each first separator 24. The hydrogen gas moves along the fuel gas channels 34 and is supplied to the anode electrodes 30 of the electrolyte membrane/electrode structural bodies 22.

Therefore, in each electrolyte membrane/electrode structural body 22, oxygen in the air supplied to the cathode electrode 32 and the hydrogen gas supplied to the anode electrode 30 are consumed by electrochemical reactions in electrode catalyst layers, thus generating electricity.

In the cooling medium supply apparatus 20, when the cooling pump 82 is operating, the cooling medium, such as pure water, ethylene glycol, or oil, is supplied from the cooling medium circulation passageway 80 to the cooling medium inlet manifold 44a of the fuel cell stack 14. The cooling medium flows along the cooling medium channels 38 and cools the electricity generating cells 12 before being discharged into the cooling medium circulation passageway 80 through the cooling medium outlet manifold 44b.

The air, after being supplied to the cathode electrodes 32 and partially consumed, is discharged into the oxidant gas discharge piping 48b through the oxidant gas outlet manifold 42b. Then, the air passes through the humidifier 58 and humidifies the fresh air supplied through the oxidant gas supply piping 48a. After that, the air is adjusted to a set pressure of the pressure regulating valve 60 and then is sucked into the turbine 52. The turbine 52 performs electrical regeneration based on exhaust energy from the fuel cell stack 14 and therefore can improve the net output of the fuel cell stack 14.

The hydrogen gas, after being supplied to and partially consumed by the anode electrode 30, is discharged into the fuel gas discharge piping 66b through the fuel gas outlet manifold 46b. Then, the hydrogen gas is introduced from the fuel gas discharge piping 66b into the hydrogen circulation passageway 74 and then is circulated through the fuel gas supply piping 66a during the sucking operation of the ejector 72. The hydrogen gas discharged into the fuel gas discharge piping 66b is discharged (purged) to the outside due to the operation of the diluter 78 according to need.

Figure 2:
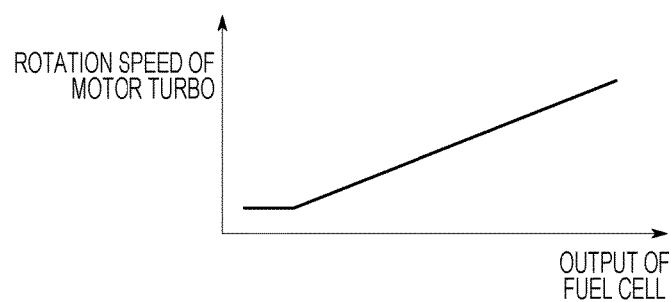
FIG. 2 is a diagram illustrating a relation between the fuel cell output and the motor turbo rotation speed.

In the fuel cell system 10, the fuel cell output and the motor turbo rotation speed have a relation indicated in FIG. 2. Concretely, at the time of high load (high output) of the fuel cell stack 14, the air compressor 50 and the turbine 52 rotate at high speeds.

Figure 3:
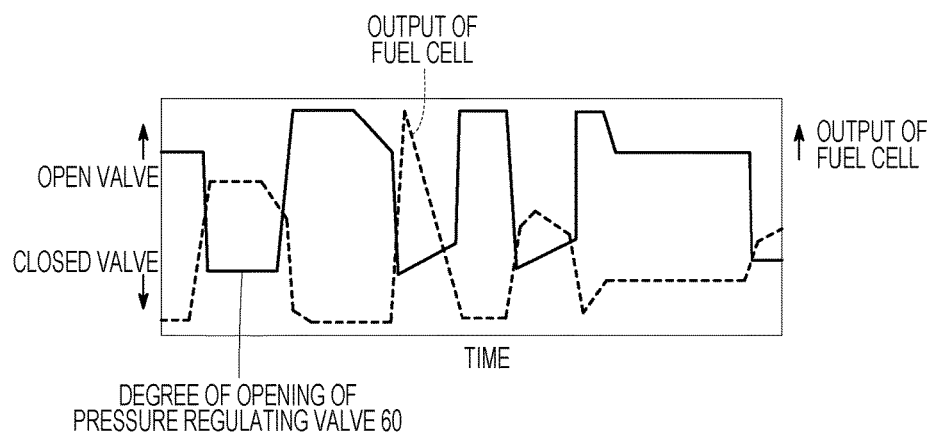
FIG. 3 is a diagram illustrating a relation between the fuel cell output and the degree of valve opening of a pressure regulating valve.

The fuel cell output and the degree of valve opening of the pressure regulating valve 60 have a relation indicated in FIG. 3. That is, at the time of high load (high output) of the fuel cell stack 14, the degree of valve opening of the pressure regulating valve 60 is reduced in order to maintain the internal pressure of the fuel cell stack 14. Therefore, as can be understood from FIG. 1, the air in the oxidant gas discharge piping 48b between the pressure regulating valve 60 and the inlet side of the turbine 52 is likely to become thin and therefore have negative pressure.

In the first embodiment, the pressure regulating valve 60 is disposed between the fuel cell stack 14 (and the humidifier 58) and the turbine 52 and, furthermore, the check valve 62 is disposed between the turbine 52 and the pressure regulating valve 60. Therefore, when, at the time of high load of the fuel cell stack 14, the pressure between the pressure regulating valve 60 and the inlet side of the turbine 52 reduces, the pressure difference relative to the atmospheric pressure causes the check valve 62 to open to the outside air. Therefore, outside air (external air) is introduced to the upstream side of the turbine 52, so that the pressure between the pressure regulating valve 60 and the inlet side of the turbine 52 increases to the atmospheric pressure.

This makes it possible to inhibit, as much as possible, the upstream side of the turbine 52 from having negative pressure even when the turbine 52 is driven at high rotation speed. Therefore, it becomes possible to prevent an event in which the pressure on the upstream side of the turbine 52 becomes lower than the pressure on the downstream side of the turbine 52 and therefore favorably prevent reduction of the net output of the fuel cell stack 14.

Furthermore, in the first embodiment, the air filter 64 is disposed at the outside air side of the check valve 62. Therefore, because the outside air passes through the air filter 64, impurities mixed in the outside air, if any, can be trapped by the air filter 64 Therefore, defects of the turbine 52 (rotation failure, corrosion, etc.) can be certainly prevented.

Figure 4:
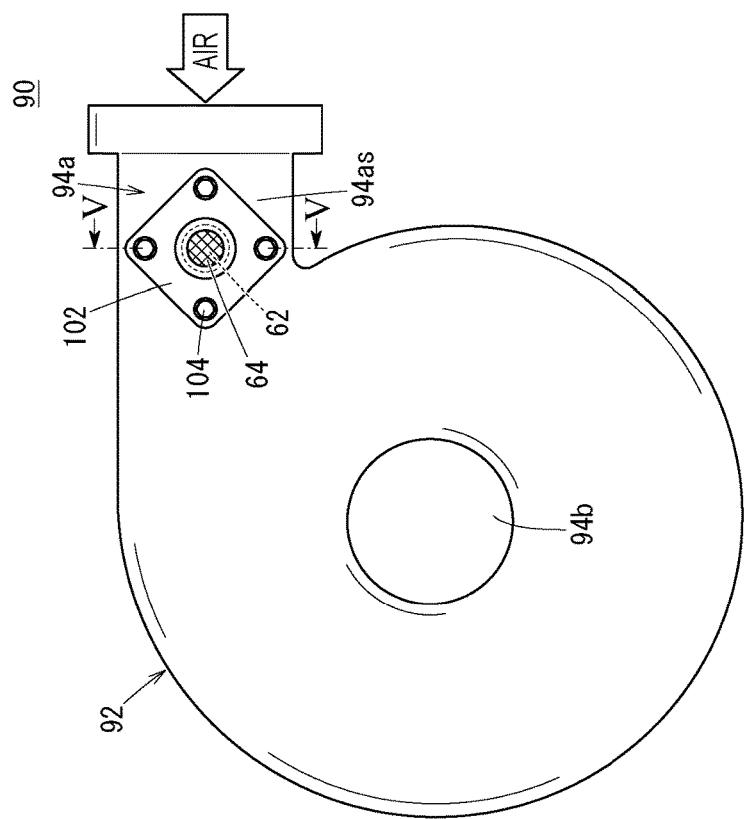
FIG. 4 is a general diagram illustrating a turbine that constitutes a fuel cell system according to a second embodiment of the present disclosure.

FIG. 4 is a general diagram illustrating a turbine 90 that constitutes a fuel cell system according to a second embodiment of the present disclosure. Note that substantially the same component elements as those of the fuel cell system 10 according to the first embodiment are given the same reference characters as given to those and will not be described in detail below. Likewise, in the third and subsequent embodiments described below, substantially the same component elements as those in the first embodiment will not be described in detail.

The turbine 90 includes a housing 92 whose outer peripheral end portion has an integrally formed air suction port 94a and whose central portion has an air discharge outlet 94b. A wall 94as of the hollow cylindrical air suction port 94a is provided with a check valve 62 that provides communication between the inside and the outside of the air suction port 94a. The wall 94as is also provided with an air filter 64 covering the check valve 62.

Figure 5:
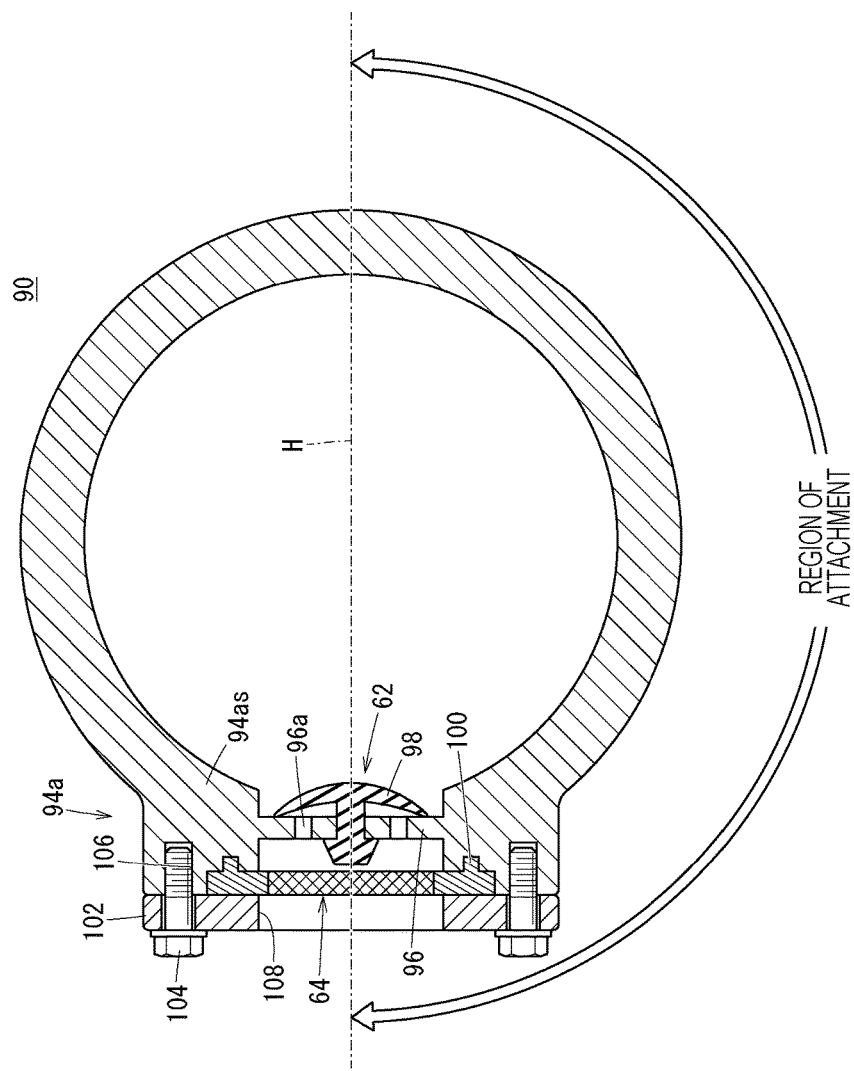
FIG. 5 is a sectional view of the turbine taken along line V-V in FIG. 4.

As shown in FIG. 5, on the wall 94as, the check valve 62 is attached below a central horizontal line H that passes through a central position of the air suction port 94a, for example, within a region of a lower half portion of the wall 94as which extends substantially 180°. The wall 94as is provided with a seat surface 96 having a reduced thickness and a hole portion 96a. The seat surface 96 is provided with an umbrella-shaped valve element 98 capable of opening and closing the hole portion 96a.

The wall 94as is provided with the air filter 64 covering the check valve 62. The air filter 64 is provided with a lug 100 that constitutes a mesh filter and that engages with the wall 94as. The air filter 64 is held by a plate 102. The plate 102 is fixed to the wall 94as by a plurality of bolts 104 screwed into threaded holes 106 formed in the wall 94as. A central portion of the plate 102 has an opening portion 108 that introduces the outside air to the check valve 62.

In the second embodiment constructed as described above, the check valve 62 can be easily attached to the wall 94as and the air filter 64 is positioned outward of the check valve 62 by using the lug 100. Therefore, the air filter 64 can be easily attached and detached.

Note that water that enters from the outside air is likely to reside on the umbrella-shaped valve element 98 of the check valve 62. In the second embodiment, the check valve 62 and the air filter 64 are attached to the wall 94as, at locations below the central horizontal line H that passes through a central position of the air suction port 94a. Therefore, the check valve 62 does not accumulate water, so that, for example, it is possible to avoid operation failure caused by the freezing of water accumulated on the umbrella-shaped valve element 98. Furthermore, the clogging of the air filter 64 due to the freezing of water will not occur, so that it becomes possible to prevent failure in the passage of outside air.

Figure 6:
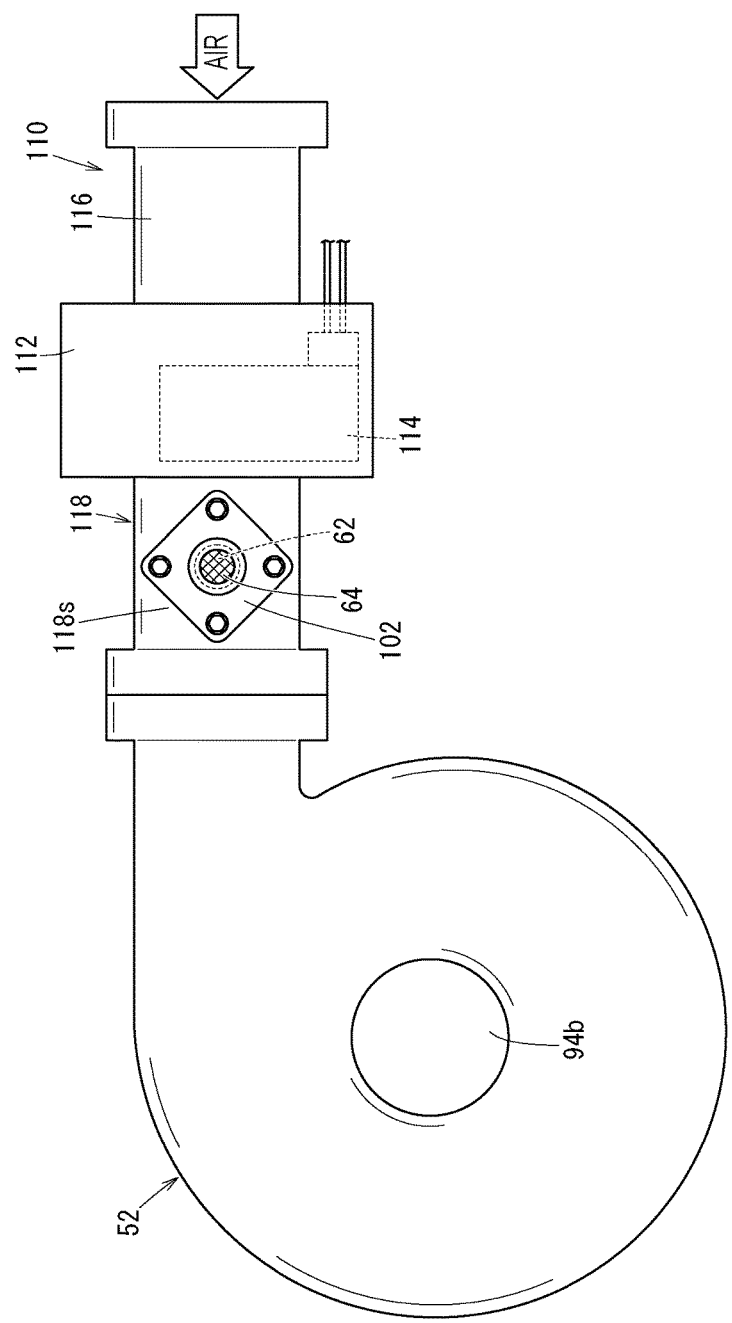
FIG. 6 is a general diagram illustrating a pressure regulating valve that constitutes a fuel cell system according to a third embodiment of the present disclosure.

FIG. 6 is a general diagram illustrating a pressure regulating valve 110 that constitutes a fuel cell system according to a third embodiment of the present disclosure.

The pressure regulating valve 110 includes a housing 112 in which a main unit (actuator) 114 is housed. An end of the housing 112 is provided with an inlet piping portion 116 and another end of the housing 112 is provided with an outlet piping portion (air suction port) 118. An end surface of the outlet piping portion 118 is connected to an air suction-side end surface of a turbine 52.

The outlet piping portion 118 has a hollow cylindrical shape. A wall 118s of the outlet piping portion 118 is provided with a check valve 62 that provides communication between the inside and the outside of the outlet piping portion 118. An air filter 64 covering the check valve 62 is attached to the wall 118s. The attaching structure for the air filter 64 is substantially the same as in the second embodiment and will not be described in detail again.

The third embodiment constructed as described above can achieve substantially the same advantageous effects as the foregoing second embodiment. For instance, the check valve 62 does not accumulate water, so that, for example, it is possible to avoid operation failure caused by the freezing of water accumulated on the valve element.

Figure 7:
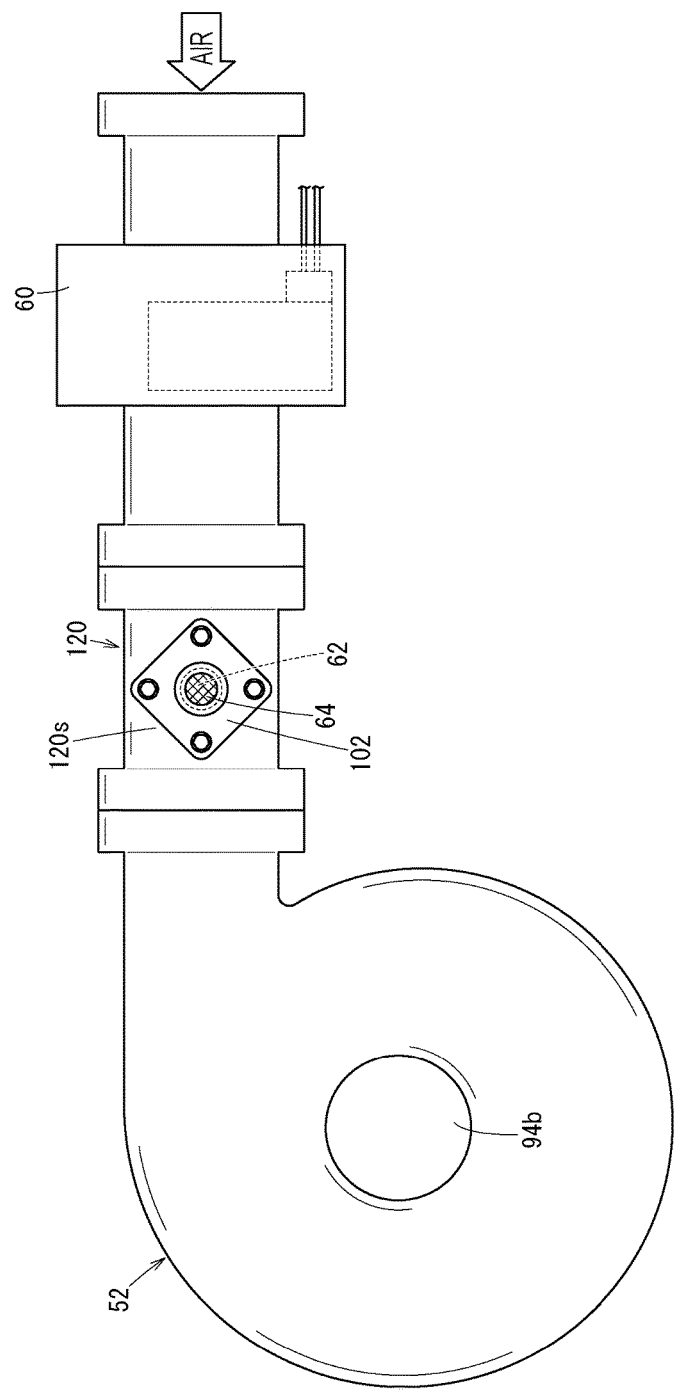
FIG. 7 is a general diagram illustrating an intermediate piping that constitutes a fuel cell system according to a fourth embodiment of the present disclosure.

FIG. 7 is a general diagram illustrating an intermediate piping 120 that constitutes a fuel cell system according to a fourth embodiment of the present disclosure.

The intermediate piping 120 is a cylindrical piping that connects a pressure regulating valve 60 and a turbine 52. A wall 120s of the intermediate piping 120 is provided with a check valve 62 that provides communication between the inside and the outside of the intermediate piping 120. An air filter 64 covering the check valve 62 is attached to the wall 120s. The attaching structure for the air filter 64 is substantially the same as in the second embodiment and will not be described in detail below.

The fourth embodiment constructed as described above achieve substantially the same advantageous effects as the foregoing second and third embodiments. For instance, the check valve 62 does not accumulate water, so that, for example, it is possible to avoid operation failure caused by the freezing of water accumulated on the valve element.

Figure 8:
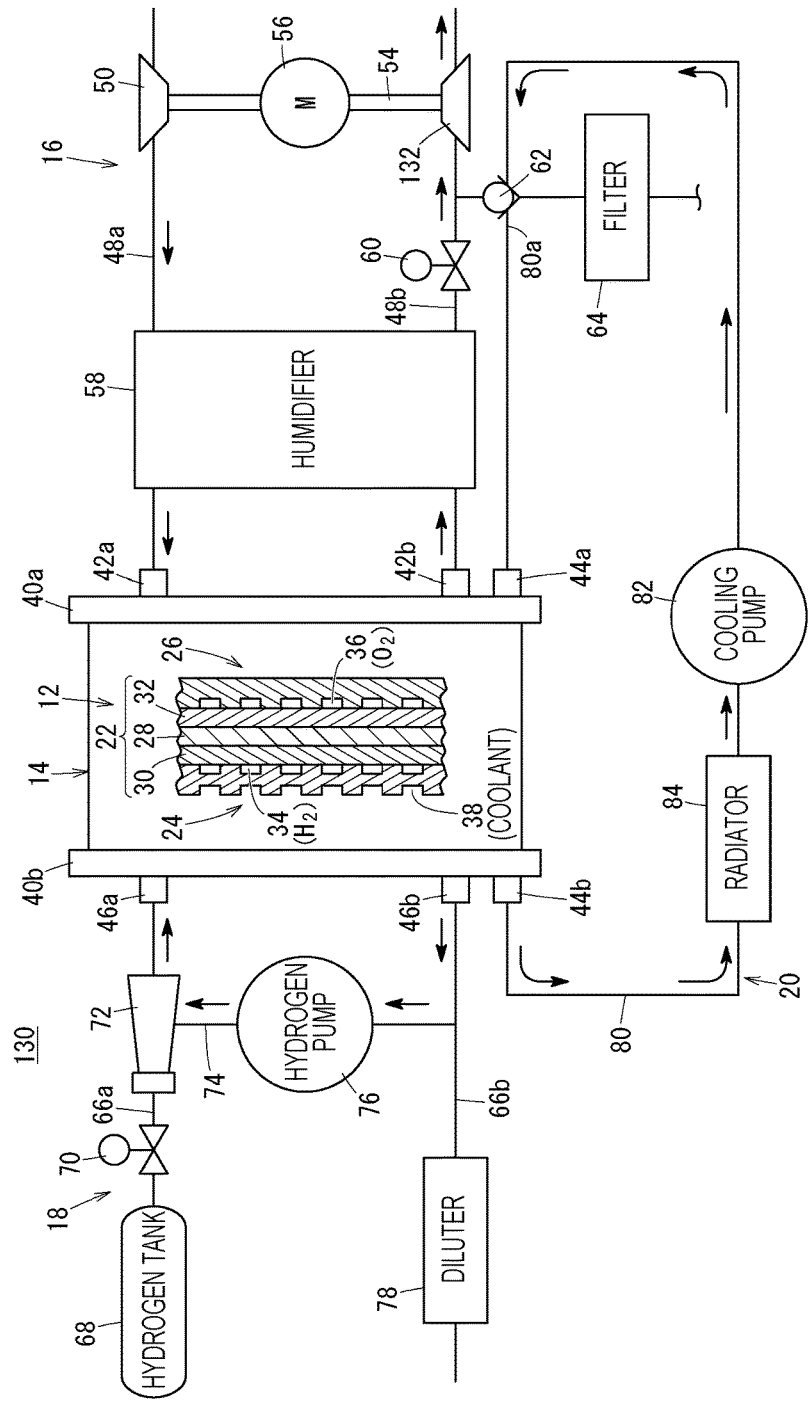
FIG. 8 is a general diagram illustrating a construction of a fuel cell system according to a fifth embodiment of the present disclosure.

FIG. 8 is a general diagram illustrating a construction of a fuel cell system 130 according to a fifth embodiment of the present disclosure.

Figure 9:
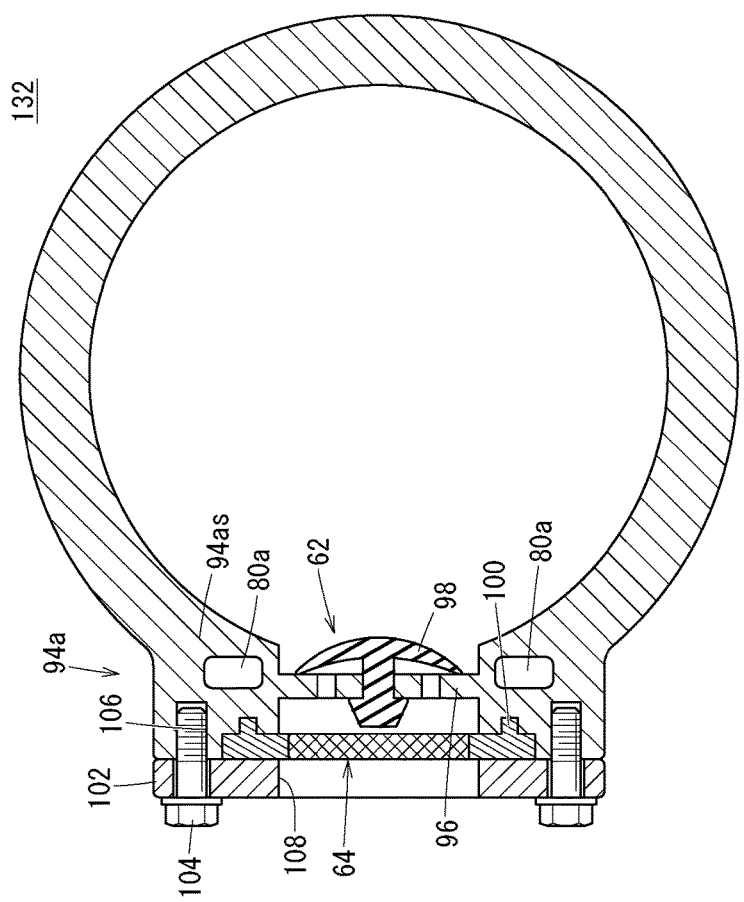
FIG. 9 is a sectional view illustrating portions of a turbine that constitutes the fuel cell system according to the fifth embodiment.

The fuel cell system 130 includes a turbine 132. Channel portions 80a of a cooling medium circulation passageway 80 that constitutes a cooling medium supply apparatus 20 are provided directly on a check valve 62 or near an umbrella-shaped valve element 98 of the check valve 62. As shown in FIG. 9, the turbine 132 is constructed in substantially the same manner as the turbine 90 according to the second embodiment. Substantially the same component elements of the turbine 132 as those of the turbine 90 are given the same reference characters as given to those and will not be described in detail below.

An air suction port 94a of the turbine 132 is provided with a pair of channel portions 80a formed within a wall 94as by casting with pipe inserts or cores. The two channel portions 80a are disposed above and below the check valve 62. The attaching locations of a check valve 62 and an air filter 64 are not limited. The check valve 62 and the air filter 64 may be disposed at any locations on the wall 94as.

In the fifth embodiment constructed as described above, the relatively high temperature cooling medium discharged from the fuel cell stack 14 passes through the pair of channel portions 80a and therefore heats the check valve 62 and the air filter 64. Therefore, it becomes possible to remove the freezing of accumulated water drops, so that an advantageous effect of being able to certainly avoid operation failure of the check valve 62 can be obtained.

A fuel cell system according to a present disclosure includes a fuel cell, an oxidant gas supply piping, an oxidant gas discharge piping, an air compressor, a turbine, and a pressure regulating valve. The fuel cell generates electricity through an electrochemical reaction between a fuel gas and an oxidant gas. The oxidant gas supply piping supplies the oxidant gas to the fuel cell while the oxidant gas discharge piping discharges the oxidant gas from the fuel cell.

The turbine is disposed on the oxidant gas discharge piping and provided on the same shaft as the air compressor.

The pressure regulating valve is disposed on the oxidant gas discharge piping, at a location between the fuel cell and the turbine.

Between the turbine and the pressure regulating valve there is disposed a check valve that communicates with outside air so as to introduce external air to the turbine.

In this fuel cell system, an air filter may be disposed at an outside air side of the check valve.

Furthermore, a housing that constitutes the turbine may have an air suction port of the turbine which is provided as an integral unit with the housing or provided separately from the housing, a wall of the air suction port may be provided with the check valve that provides communication between an inside and an outside of the air suction port, and the air filter may be attached to the wall so as to cover the check valve.

Still further, in this fuel cell system, the check valve may be disposed below a position of a central horizontal line of the air suction port of the turbine.

Further, this fuel cell system may further include a cooling medium circulation piping that circulates a cooling medium in the fuel cell, and a portion of the cooling medium circulation piping may be provided directly on the check valve or near the check valve.

According to the present disclosure, the pressure regulating valve is disposed between the fuel cell and the turbine, and the check valve that communicates with the outside air so as to introduce the external air to the turbine is disposed between the turbine and the pressure regulating valve. Therefore, when, at the time of high-load electricity generation of the fuel cell, the turbine is driven at high rotation speed and the valve opening area of the pressure regulating valve is reduced so that the upstream side of the turbine has negative pressure, the check valve becomes open to the outside air due to the atmospheric pressure. Therefore, the outside air is introduced to the upstream side of the turbine, so that the pressure on the upstream side of the turbine increases to the atmospheric pressure.

This makes it possible to inhibit, as much as possible, the upstream side of the turbine from having negative pressure even when the turbine is driven at high rotation speed. Therefore, it becomes possible to avoid the decline in the system's efficiency caused by reversal of the normal relation between the pressures upstream and downstream of the turbine.

Obviously, numerous modifications and variations of the present invention are possible in light of the above teachings. It is therefore to be understood that within the scope of the appended claims, the invention may be practiced otherwise than as specifically described herein.

What is claimed is:
1. A fuel cell system comprising:
   a fuel cell that generates electricity through an electrochemical reaction between a fuel gas and an oxidant gas;
   an oxidant gas supply piping that supplies the oxidant gas to the fuel cell;
   an oxidant gas discharge piping that discharges the oxidant gas from the fuel cell;
   an air compressor disposed on the oxidant gas supply piping;
   a turbine disposed on the oxidant gas discharge piping and provided on the same shaft as the air compressor;
   a pressure regulating valve disposed on the oxidant gas discharge piping between the fuel cell and the turbine;

a check valve that is provided between the turbine and the pressure regulating valve and that communicates with outside air so as to introduce an external air to the turbine; and an air filter disposed at an outside air side of the check valve, wherein a housing that constitutes the turbine has an air suction port of the turbine which is provided integrally with the housing or provided separately from the housing, and wherein a wall of the air suction port is provided with the check valve that provides communication between an inside and an outside of the air suction port and the air filter is attached to the wall so as to cover the check valve.

2. The fuel cell system according to claim 1, wherein the check valve is disposed below a position of a central horizontal line of the air suction port of the turbine.

3. The fuel cell system according to claim 1, further comprising a cooling medium circulation piping that circulates a cooling medium in the fuel cell, wherein a portion of the cooling medium circulation piping is provided directly on the check valve or near the check valve.

4. A fuel cell system comprising:

a fuel cell to generate electric power through an electrochemical reaction between a fuel gas and an oxidant gas;

an oxidant gas supply piping which is connected to the fuel cell and through which the oxidant gas is to flow to the fuel cell;

an oxidant gas discharge piping which is connected to the fuel cell and via which the oxidant gas is to be discharged from the fuel cell;

an air compressor connected to the oxidant gas supply piping and being rotatable around a rotational shaft;

a turbine connected to the oxidant gas discharge piping and being rotatable around the rotational shaft;

a pressure regulating valve disposed in the oxidant gas discharge piping between the fuel cell and the turbine;

a check valve connected to the oxidant gas discharge piping between the turbine and the pressure regulating valve to introduce an external air to the turbine; and an air filter disposed at an outside air side of the check valve, wherein a housing that constitutes the turbine has an air suction port of the turbine which is provided integrally with the housing or provided separately from the housing, and wherein a wall of the air suction port is provided with the check valve that provides communication between an inside and an outside of the air suction port and the air filter is attached to the wall so as to cover the check valve.

5. The fuel cell system according to claim 4, wherein the check valve is disposed below a position of a central horizontal line of the air suction port of the turbine.

6. The fuel cell system according to claim 4, further comprising a cooling medium circulation piping that circulates a cooling medium in the fuel cell, wherein a portion of the cooling medium circulation piping is provided directly on the check valve or near the check valve.

* * * * *